Patented Apr. 23, 1929.

1,710,045

UNITED STATES PATENT OFFICE.

LEONHARD DEUTSCH AND ISAK THORN, OF VIENNA, AUSTRIA, ASSIGNORS TO THE SELDEN COMPANY, OF PITTSBURGH, PENNSYLVANIA, A CORPORATION OF DELAWARE.

PROCESS OF PRODUCING LIGHT-COLORED, HARD, INFUSIBLE, AND INSOLUBLE PHENOL-ALDEHYDE PRODUCTS.

No Drawing. Original application filed September 15, 1923, Serial No. 662,997, and in Austria November 30, 1922. Divided and this application filed March 2, 1928. Serial No. 258,685.

This invention relates to the process of preparing light colored, hard, insoluble phenol-aldehyde condensation products.

The known processes of condensing phenols and aldehydes frequently result in the products which are dark colored and which are only suitable for rough uses such as electrical insulation and the like. We have discovered that impurities in the raw materials rather than the products of condensation themselves are responsible for the discoloration of the products obtained. These impurities may be inorganic such as metal salts, particularly those of copper and iron, or organic such as higher phenols, carbohydrates, sulfur compounds and the like. While it is possible to produce light colored products by using perfectly pure raw products, such as for example freshly distilled or preferably synthetic phenols and formaldehydes dissolved in distilled water and avoiding apparatus presenting iron or copper surfaces to the reaction mixture or by washing or extraction processes the resulting products are rendered very expensive as in the one case the cost of the raw materials is greatly increased and in the other case the yields are greatly decreased.

According to the present invention, we have found that the undesirable impurities causing the discoloration can be disintegrated by strong acids but are substantially unaffected in weak acid, neutral or alkaline solutions in the presence of oxidizing or reducing agents. Strong acids destroy the impurities but are unsuitable as they cause further reaction with the condensation products but we have found that there is an exception to the ineffectiveness of the weak reagents for we have found that phosphoric acid compounds are capable of reacting with the impurities causing discoloration so as to render them harmless.

The phosphoric acid compound may be added before initial condensation or after initial condensation. It is preferable in order to assure continuous maintenance of the light color to acidify the condensation product after clarification before final hardening. The acidification should preferably take place with weak acids in such quantities as to prevent acceleration of the hardening by reason of the excess acid action as a condensation agent.

*Example 1.*

1 kilogram of phenol and 1 kilogram of 40% formaldehyde solution of the usual commercial and technical grades are mixed with 10 to 20 grammes of sodium carbonate and of 0.5 to 5 grammes of sodium phosphate and caused to react. 40 to 80 grammes of lactic acid of 50% are then added, the water is removed and the product hardened in known manner.

This application is a division of our copending application Serial No. 662,997, filed September 15, 1923.

What is claimed as new is:

1. A process of producing light colored, hard, infusible, and insoluble phenol-aldehyde condensation products, which comprises subjecting the reactive components to condensation with an alkali and hardening the products which have been subjected to treatment with a hygroscopic compound containing the phosphoric acid radical before hardening, the amount and character of the phosphoric acid compound being such that the mixture is not sufficiently acid to bring about condensation under conditions of acid catalysis.

2. A process of producing light colored, hard, infusible, and insoluble phenol-aldehyde condensation products, which comprises subjecting a phenol and an aqueous solution of an aldehyde to condensation with an alkaline condensation agent, subsequently adding a hygroscopic compound containing a phosphoric acid radical, the amount and character of the phosphoric acid compound being such that the mixture is not sufficiently acid to bring about condensation under conditions of acid catalysis.

3. A process according to claim 1 in which the phosphoric acid compound added is an alkali metal phosphate.

4. A process according to claim 1 in which the phosphoric acid compound added is a sodium phosphate.

Signed at Vienna, Austria, this 13th day of February, 1928.

Dr. LEONHARD DEUTSCH.
Ing. ISAK THORN.

CERTIFICATE OF CORRECTION.

Patent No. 1,710,045.  Granted April 23, 1929, to

LEONHARD DEUTSCH ET AL.

It is hereby certified that error appears in the printed specification of the above numbered patent requiring correction as follows: Line 94, claim 2, after the word "catalysis" and before the period insert the words "and then hardening by heat"; and that the said Letters Patent should be read with this correction therein that the same may conform to the record of the case in the Patent Office.

Signed and sealed this 11th day of June, A. D. 1929.

(Seal)

M. J. Moore,
Acting Commissioner of Patents.